E. H. GOLD.

HEATING SYSTEM.

APPLICATION FILED AUG. 13, 1909.

Reissued Dec. 21, 1909.

13,059.

4 SHEETS—SHEET 1.

Witnesses,
B. A. Perry
H. L. Peck

Inventor
Egbert H. Gold
By O. R. Barnett
Attorney

E. H. GOLD.

HEATING SYSTEM.

APPLICATION FILED AUG. 13, 1909.

Reissued Dec. 21, 1909.

13,059.

4 SHEETS—SHEET 2.

Witnesses:
H. L. Peck

Inventor:
E. H. Gold.
By O. R. Barnett
Attorney

E. H. GOLD.
HEATING SYSTEM.
APPLICATION FILED AUG. 13, 1909.
Reissued Dec. 21, 1909.
13,059.
4 SHEETS—SHEET 3.
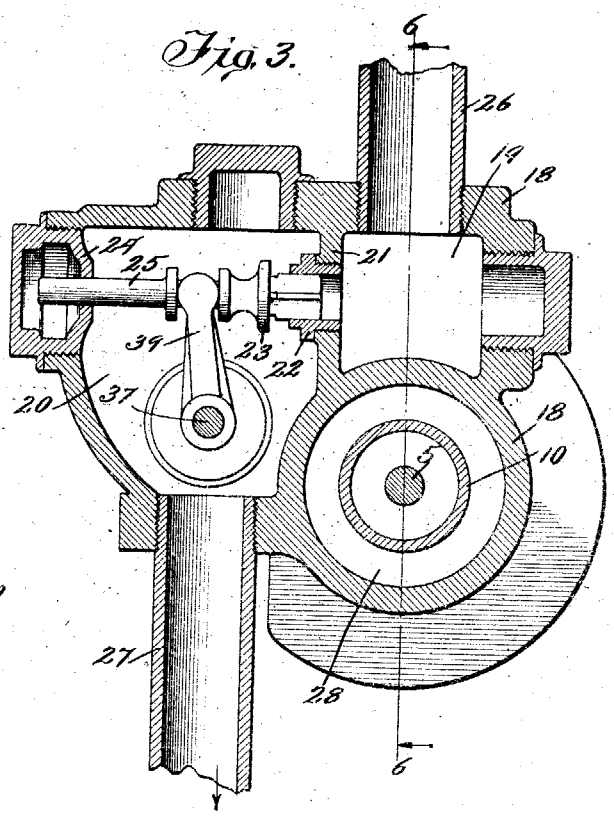
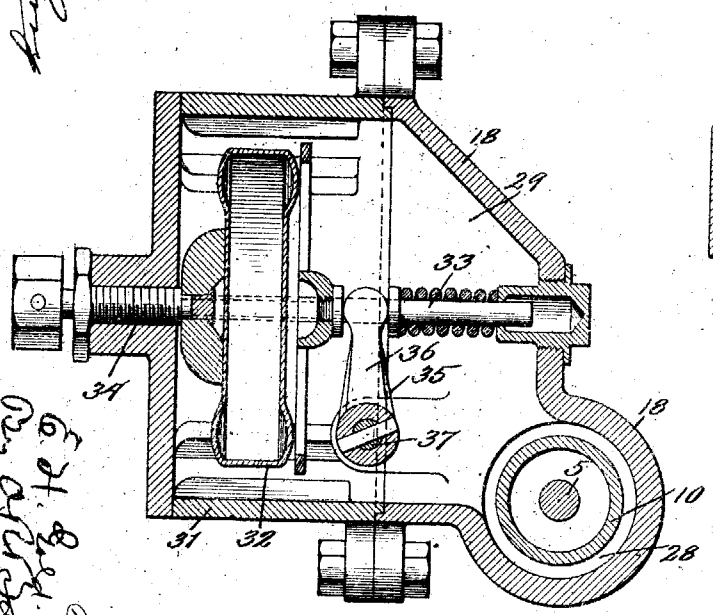
Witnesses:
Ira P. Perry
H. L. Peck
Inventor:
E. H. Gold.
By A. R. Barnett
Attorney

E. H. GOLD.

HEATING SYSTEM.

APPLICATION FILED AUG. 13, 1909.

Reissued Dec. 21, 1909.

13,059.

4 SHEETS—SHEET 4.

Witnesses:
Ralph Perry
H. L. Peck

Inventor:
E. H. Gold,
By O. R. Garnett
Attorney

UNITED STATES PATENT OFFICE.

EGBERT H. GOLD, OF CHICAGO, ILLINOIS.

HEATING SYSTEM.

13,059. Specification of Reissued Letters Patent. Reissued Dec. 21, 1909.

Original No. 890,138, dated June 9, 1908, Serial No. 318,015. Application for reissue filed August 13, 1909. Serial No. 512,762.

*To all whom it may concern:*

Be it known that I, EGBERT H. GOLD, a citizen of the United States, and a resident of the city of Chicago, in the county of Cook and State of Illinois, have invented certain new and useful Improvements in Heating Systems; and I do hereby declare that the following is a full, clear, and exact description of the same, reference being had to the accompanying drawings, and to the figures of reference marked thereon, which form a part of this specification.

My invention relates to improvements in heating systems, particularly in those systems so constructed as to be operated by substantially supply-pipe pressure or at a predetermined lower pressure at will, and is particularly intended for use in the equipping of passenger cars.

Among the various objects of my invention is the provision of a device which may be readily attached to a standard type of car heating system arranged to be operated under supply-pipe pressure, whereby, with a minimum disturbance of existing installations, the system may be made operative at will at either supply-pipe pressure or at a lower pressure, such as what has come to be known as the "vapor system." These and such other objects as may hereafter appear are attained by my present invention, a convenient embodiment of which is shown in the accompanying drawings, in which—

Figure 1:
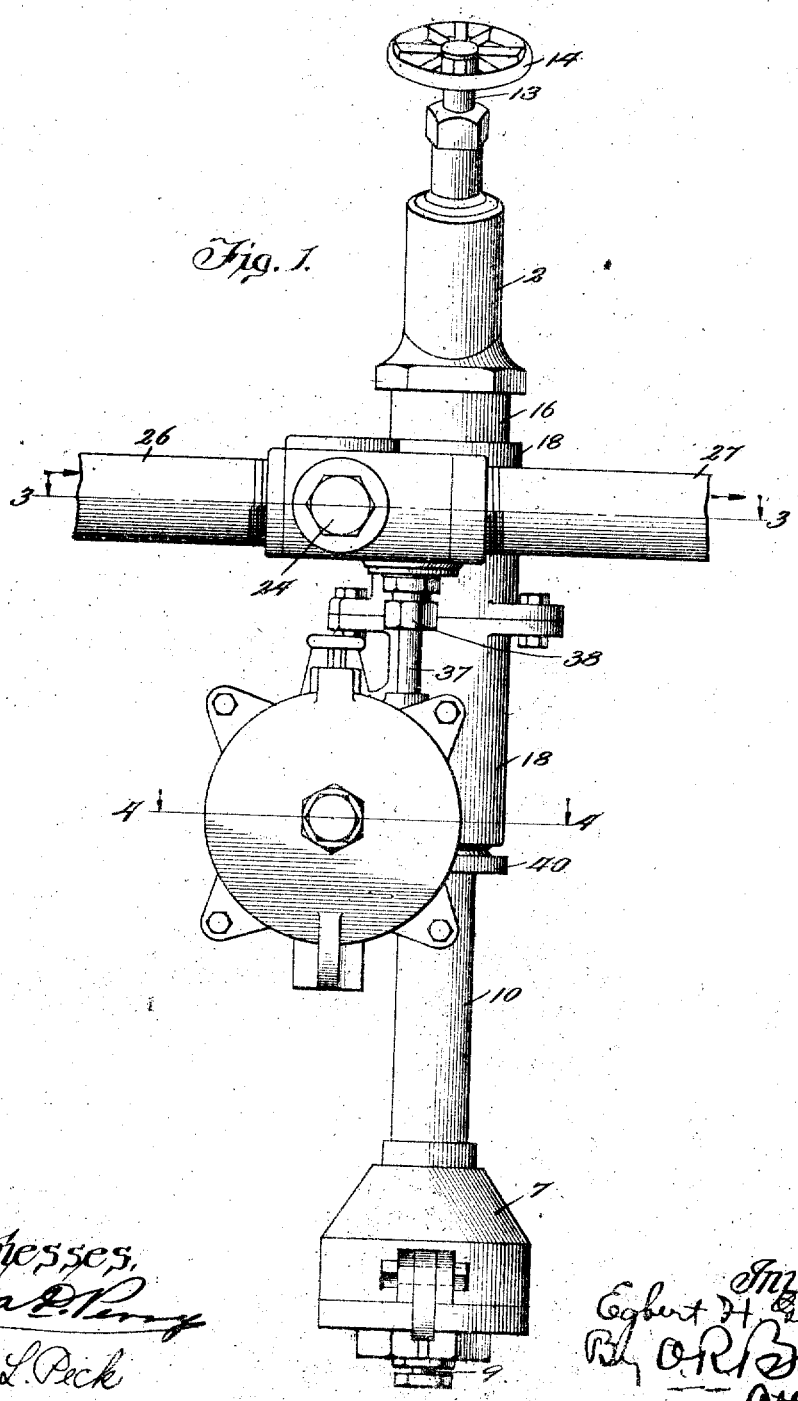
Figure 2:
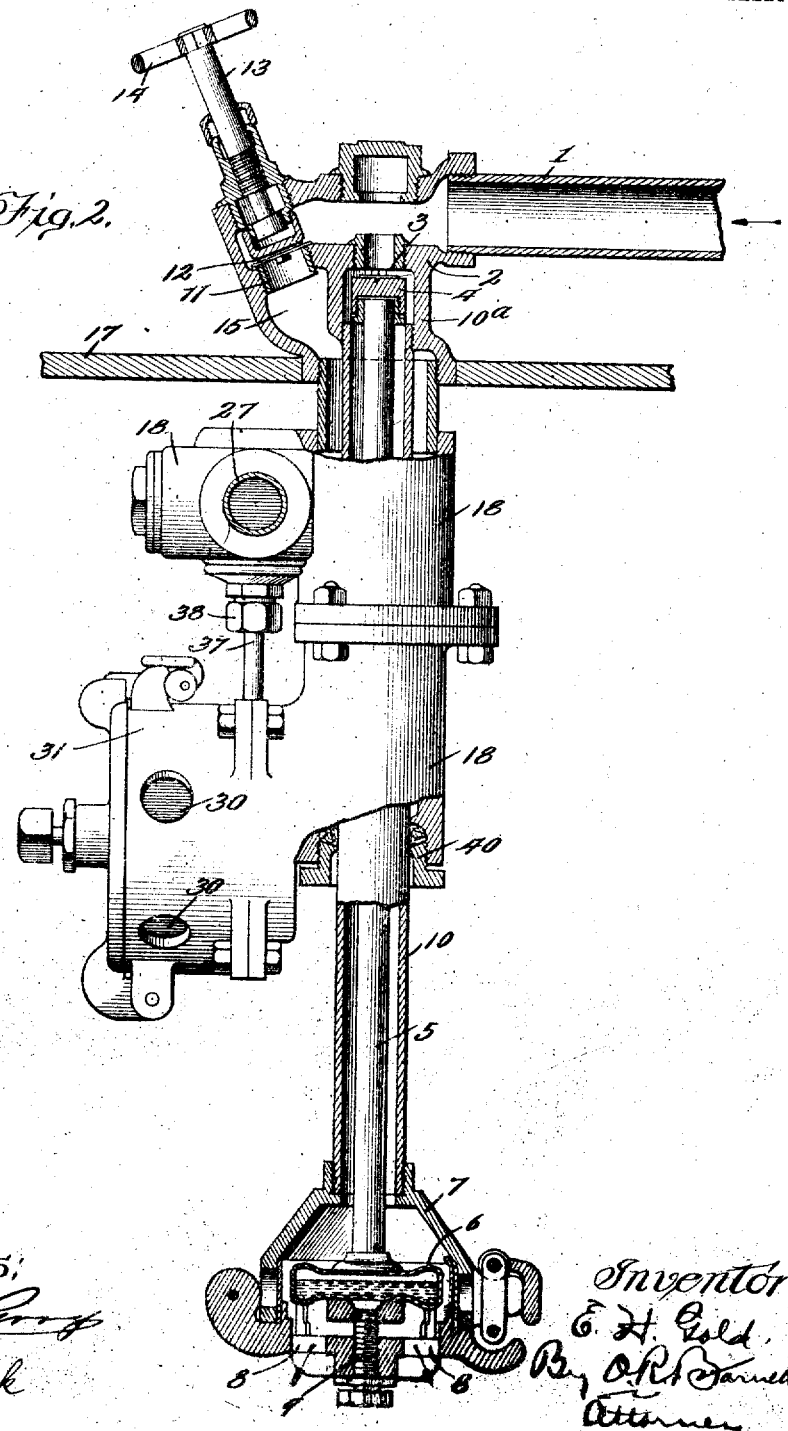
Figure 5:
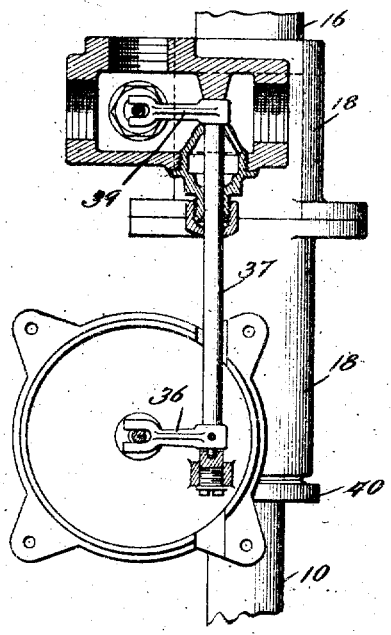
Figure 6:
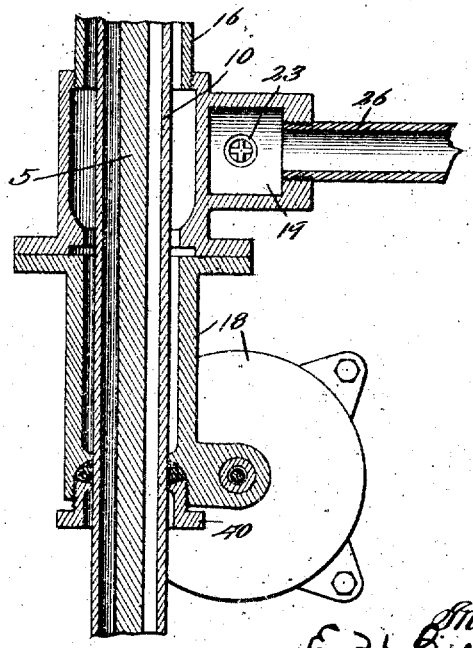

Figure 1 shows, in elevation, a standard automatic steam trap of a high-pressure heating system fitted with an attachment whereby the supply to said system may be automatically controlled by the temperature of the heating medium at a point adjacent to or relatively near the outlet of the steam. Fig. 2 is a view, partially in vertical section, of Fig. 1. Fig. 3 is a cross-section on the line 3—3 of Fig. 1, looking in the direction indicated by the arrows. Fig. 4 is a section on the line 4—4 of Fig. 1, looking in the direction indicated by the arrows. Fig. 5 is a detail elevation with certain parts in section. Fig. 6 is a sectional view on the line 6—6 of Fig. 3, looking in the direction of the arrows.

Like reference characters indicate the same parts in the several figures of the drawings.

In passenger cars which are heated by direct steam supply from the train-pipe, a standard type of automatic steam trap is substantially the same as the trap shown in my Patent No. 752,219. Such a trap is indicated in Fig. 2 of the present drawings, in which 1 is the return or exhaust-pipe leading from the radiating system into the valve-casing 2, which is provided with a valve-seat 3. The opening through this valve-seat is adapted to be automatically opened and closed by a valve 4 mounted on a valve-stem 5 and actuated by a thermostatic member, such as the flexible diaphragm 6, which is hollow and contains a volatile fluid, and is mounted in a diaphragm-casing 7, from which the water of condensation and cold air may escape through openings 8. This diaphragm is provided with an adjusting stem 9 whereby the automatic action of the valve 4 may be properly adjusted. From the valve-seat 3 a casing or drip pipe 10, $10^a$ extends downwardly, connecting with the diaphragm-casing 7. The action of this valve is familiar. When steam is primarily admitted to the heating system the cold air, and any accumulation of water of condensation, is forced through the valve-seat 3, the casing 10, $10^a$ and the diaphragm-casing 7 and out through the openings 8, the diaphragm 6 being cold and contracted. As the radiating pipes are filled with steam, the steam fills the return-pipe 1 and thence flows downwardly through the valve seat 3, the casing 10, $10^a$ into the diaphragm-chamber 7 and around the diaphragm 6, thereby heating and expanding the diaphragm 6 which, thereupon, lifts the valve-stem 5 and closes the valve 4 against the seat 3. With such valves it is also usual to provide the casing 2 with a blow-off valve, comprising a valve-seat 11 and a valve 12, provided with a valve-stem 13 and a hand-wheel 14. This blow-off valve is normally closed and leads around the valve seat 3 to a passage-way 15 connecting with an outer pipe or casing 16, which usually and preferably extends downwardly to a point adjacent to the top of the diaphragm-chamber 7. With this construction, whenever the blow-off valve is open the water of condenstion, cold air and steam will flow freely through the blow-off valve, around the casing or pipe 10, and against the diaphragm-casing 7, and thence to the atmosphere, so that a quick and free blow-off is provided and, in case any part of the automatic trap has become frozen, it may be readily thawed out. I have thus particularly described such standard device because my present invention is peculiarly adapted as an attachment for such a device, with a minimum disturbance thereof. As ordinarily installed, all parts of such steam trap, except the upper part of pipes 10 and 16 and the parts contained therein, are below the floor of the car which, in Fig. 2, is conveniently indicated at 17.

In attaching my present device, it is merely necessary to cut off a portion of the lower part of the blow-off pipe 16 and to mount my present attachment thereon and to then connect such attachment, with short pipes, to the train-pipe or other source of supply of the heating medium, and to the radiating pipes all of which connections can be made below the floor of the car, and thus without other disturbance of the previous installation and, without entering the car, my invention may be applied and the system may be converted into one which may be readily operated at will either under supply-pipe pressure or as a low-pressure or vapor system.

This result may be accomplished as follows: Referring now to Fig. 3, 18 is a casing provided with an inlet-chamber 19 and a valve-chamber 20, which are separated from each other by a partition 21. This partition 21 is provided with a valve-seat 22 adapted to be closed by a valve 23, which may be guided in any suitable manner as, for instance, within the valve-seat 22, and a nipple 24, in which the valve-stem 25 extends. The inlet-chamber 19 is connected with a source of supply, such as the train-pipe, by a pipe 26, while the valve-chamber 20 connects with the radiating system by a pipe 27. When the lower end of the casing or pipe 16, of the automatic steam trap previously described, has been cut away and the casing 18 mounted thereon, the passage-way between the pipes 10 and 16 will connect with the passage-way 28 in the casing 18, said passage-way being separated, by suitable partitions, from the inlet-chamber 19 and the valve-chamber 20. Consequently, still referring to Fig. 3, when steam, for example, is turned on, it will enter the chamber 19 from the pipe 26, will pass through the valve 22 and the chamber 20, and thence through the pipe 27 to the radiator, whence it will return (*vide* Fig. 2) through the pipe 1 to the casing 2. If, now, the blow-off valve 12 is open, the returning steam will not only flow through the valve seat 3 into the casing 10 and thence to the diaphragm-casing 7 and to the atmosphere, but will also flow through the valve seat 11 and pipe 16 to the passage-way 28 and thence downwardly to the outlet-chamber 29 (*vide* Fig. 4). The outlet-chamber 29 is contained in a diaphragm-casing 31, which is provided with openings or outlets 30 leading to the atmosphere, or other discharge point. The diaphragm-casing 31 contains a thermostatic member 32, which is preferably in the form of a diaphragm similar to the diaphragm 6, but which will ordinarily be mounted in a vertical position, as shown in the drawings. This diaphragm 32 is arranged to actuate a stem 33 and is provided with an adjusting stem 34. The stem 33 is held in one position, as shown in Fig. 4, by a spring 35 and engages a rock-arm 36. This rock-arm 36 is rigidly attached to a rock-shaft or stem 37, which extends upwardly (*vide* Fig. 2), and through a stuffing-box 38, into the valve-chamber 20 (*vide* Fig. 3), where it is rigidly connected with a rock-arm 39, which, in turn, engages the valve-stem 25. Consequently, when the stem 33 in the chamber 29 is held in the position shown in Fig. 4, by the spring 35, the rock-arm 39 and stem 25 will be in the corresponding position, shown in Fig. 3, and the valve 23 will be open. When, however, the flow of steam through the return-pipe 1 reaches the outlet-chamber 29, it will heat the diaphragm or thermostat 32, causing the same to expand sufficiently to overcome the expansion of the spring 35, whereupon the stem 33 will be forced against the spring 35, the spring 35 will be compressed, the rock-shaft 37 will be rocked, so as to cause a corresponding movement of the rock-arm 39 (Fig. 3) and the valve 23 will be wholly, or partially, closed, according to the degree of expansion of the thermostat 32, the expansion of which will, in turn, depend upon the relative effect of the steam in the chamber 29 and of the cooling influence acting in opposition thereto upon the thermostat 32, in addition to the action of the spring 35. Ordinarily the apparatus will be so adjusted that when the chamber 29 is filled with dry vapor the expansion of the thermostat 32 will be sufficient to close the valve 23, but, when the radiation from the heating system is of such rapidity that the steam is in a partially condensed condition when it reaches the chamber 29, the action of the thermostat 32 will simply serve to throttle the valve 23 to such an extent that there will be a sufficient inflow of steam from the high-pressure supply-pipe to compensate for the condensation which takes place between the inlet-valve 23 and the discharge-chamber 29. To prevent any leakage of steam from the passage 28 directly to the atmosphere without passing through the chamber 29, I provide a stuffing box 40 (Fig. 2).

It will be readily understood that with my invention applied in the manner above described, the steam will operate at supply-pipe pressure so long as the valve 12 (Fig. 2) is closed, for the only outlet in that event will be through the valve seat 3, which will be automatically closed whenever the escaping steam sufficiently expands the thermostat 6, or other thermostatic member which controls the action of the valve 4, but whenever the valve 12 is opened, although the thermostat controlling the valve 4 will still be actuated as before, it will not matter whether the valve 4 is open or closed, because the valve 4 will be substantially closed at all times except when there is an accumulation of condense-water or cold air in the pipes, and the return or exhaust steam will pass from the casing 2 into the casing 18, through the passage-way 28 to the chamber 29, where it will actuate the thermostat controlling the steam inlet-valve 23. Consequently, the system may be economically operated as a low-pressure or vapor system, thereby insuring a uniform and moderate heat throughout a train and, at the same time, to meet any conditions which may require it, the system may be operated at full supply-pipe pressure, whereby the temperature will be promptly and greatly increased. So, also, by leaving the valve 12 initially closed, the system may be initially heated at high pressure until the car has been raised to the desired temperature, whereupon the valve 12 may be opened, the over-heating of the car avoided, and the maintenance of the desired temperature insured.

Inasmuch as this system operates as a "vapor system" when the blow-off valve is open, it is evident that there will be no pressure in the blow-off pipe; consequently there is no need for a tight joint between the blow-off pipe and the casing 18. This enables me to use a simple slip joint at this point, so that the casing 18 may be turned on this joint to permit of the adjustment of the connecting pipes at any convenient angle which the construction and fittings of any particular car may require. So, also, the construction of the casing 18 is such that the ports to which the steam pipes are connected may be tapped in at any one of several points, thus permitting of the ready adjustment of this casing 18 to a car already in service and in connection with the previously installed steam pipes, with a minimum of delay and expense.

I claim:

1. The combination with a radiating system, a supply pipe and a trap communicating with the radiating system said trap comprising a drip pipe, a valve to close said drip pipe, a blow-off pipe, and a non-automatic valve for said blow-off pipe, of an attachment connected with said trap said attachment comprising a casing having therein a valve chamber communicating with said supply pipe and with the radiating system and an outlet chamber communicating with the blow-off pipe, an inlet valve in said valve chamber to shut off communication between the supply pipe and the radiating system, and a thermostatic device in the outlet chamber to control said inlet valve.

2. The combination with a radiating system, a supply pipe and a trap communicating with the radiating system said trap comprising a drip pipe, a valve to close said drip pipe, a blow-off pipe, and a non-automatic valve for said blow-off pipe, of an attachment connected with said trap said attachment comprising a casing having therein a valve chamber communicating with said supply pipe and with the radiating system and an outlet chamber connected with the blow-off pipe, an inlet valve in said valve chamber to shut off communication between the supply pipe and the radiating system, and a thermostatic device in the outlet chamber to control said inlet valve, said attachment rotatably connected with the trap.

3. The combination with a radiating system, a supply pipe and a trap connected with the radiating system and comprising an inner drip pipe and an outer blow-off pipe and valves for the same respectively, of an attachment comprising a casing surrounding said drip pipe and having a valve chamber communicating with the supply pipe and the radiating system and an outlet chamber communicating with the blow-off pipe, an inlet valve in the valve chamber to shut off communication between the supply pipe and the radiating system, and a thermostatic device in said outlet chamber to operate said inlet valve.

4. The combination with a radiating system of a supply pipe, an exhaust pipe, a drip pipe leading from the exhaust pipe, a valve to automatically close the drip pipe, a blow-off pipe leading from the exhaust pipe, a non-automatic valve to close said blow-off pipe, a casing attached to and having chambers in communication with the blow-off pipe and the inlet end of the radiating system, respectively, an inlet valve in said casing to control the flow of heating fluid from the supply pipe, and a thermostatic device in said casing and in communication with the blow-off pipe to operate the inlet valve.

5. The combination with a radiating system, of a supply pipe, an exhaust pipe, a drip pipe leading from the exhaust pipe, a valve to automatically close the drip pipe, a blow-off pipe leading from the exhaust pipe beyond the drip pipe, a non-automatic valve to close said blow-off pipe a casing attached to and having chambers in communication with the blow-off pipe and the inlet end of the radiating system, respectively, an inlet valve in said casing to control the flow of heating fluid from the supply pipe, and a thermostatic device in said casing and in communication with the blow-off pipe to operate the inlet valve.

6. The combination with a radiating system, of a supply pipe, an exhaust pipe, a drip pipe leading from the exhaust pipe, a valve to automatically close the drip pipe, a blow-off pipe leading from the exhaust pipe, a manually operated valve to open and close the blow-off pipe without obstruction to the flow of heating fluid to the drip pipe a casing attached to and having chambers in communication with the blow-off pipe and the inlet end of the radiating system, respectively, an inlet valve in said casing to control the flow of fluid from the supply pipe, and a thermostatic device in said casing and in communication with the blow-off pipe to operate said inlet valve.

7. The combination with a radiating system, a supply pipe and a trap communicating with the radiating system and comprising a drip pipe, a thermostatic valve to close said drip pipe, a blow-off pipe, and a non-automatic valve for said blow-off pipe, of an attachment connected with said trap and comprising a casing having therein a valve chamber communicating with said supply pipe and with the radiating system, and an outlet chamber communicating with the blow-off pipe, an inlet valve in said valve chamber to shut off communication between the supply pipe and the radiating system, and a thermostatic device in the outlet chamber to control said inlet valve.

8. The combination with a radiating system, a supply pipe and a trap communicating with the radiating system, said trap comprising a drip pipe, a valve to close said drip pipe, a blow-off pipe and a non-automatic valve for said blow-off pipe; of an attachment connected with said trap and supply pipe said attachment comprising a valve chamber communicating with said supply pipe and with the radiating system, and an outlet chamber communicating with the blow-off pipe, an inlet valve in said valve chamber to shut off the communication between the supply pipe and the radiating system, and a thermostatic device arranged so as to be influenced by the fluid discharged into said blow-off pipe to control said inlet valve.

9. The combination with a radiating system, a supply pipe and a trap connected with said radiating system and comprising an inner drip pipe an outer blow-off pipe an automatic valve for said drip pipe and a non-automatic valve for said blow-off pipe, of an attachment connected with the blow-off pipe and supply pipe provided with a valve chamber communicating with the supply pipe and the radiating system and an outlet chamber communicating with the blow-off pipe, an inlet valve in said valve chamber to shut off communication between the supply pipe and the radiating system, and a thermostatic device arranged so as to be influenced by the fluid discharged into said blow-off pipe to operate said inlet valve.

10. The combination with a radiating system, of a supply pipe, an exhaust pipe, a drip pipe leading from the exhaust pipe, a valve to automatically close the drip pipe, a blow-off pipe leading from the exhaust pipe, a non-automatic valve to close said blow-off pipe, means attached to the supply pipe and the blow-off pipe comprising chambers in communication with the blow-off pipe and the inlet end of the radiating system, respectively, an inlet valve to control the flow of heating fluid from the supply pipe, and a thermostatic device arranged to be influenced by the fluid discharged into said blow-off pipe to operate the inlet valve.

11. The combination with a radiating system, of a supply pipe, an exhaust pipe, a drip pipe leading from the exhaust pipe, a valve to automatically close the drip pipe, a blow-off pipe leading from the exhaust pipe, a manually operated valve to open and close the blow-off pipe without obstruction to the flow of heating fluid to the drip pipe, means attached to the supply pipe and the blow-off pipe comprising chambers in communication with the blow-off pipe and the inlet end of the radiating system, respectively, an inlet valve to control the flow of the heating fluid from the supply pipe to the radiating system and a thermostatic device arranged so as to be influenced by the fluid discharged into the blow-off pipe to operate said inlet valve.

12. The combination with a radiating system, of a supply pipe, an exhaust pipe, an automatic trap in said exhaust pipe, an inlet valve to control the flow from the supply pipe into the radiating system, a blow-off pipe, a thermostatic device arranged so as to be influenced by the fluid discharged into said blow-off pipe and connected with the inlet valve so as to operate the same, and a non-automatic valve for closing the blow-off pipe.

13. The combination with a radiating system, of a supply pipe, an exhaust pipe, an automatic trap in said exhaust pipe, an inlet valve to control the flow from the supply pipe into the radiating system, a blow-off pipe, a thermostatic device arranged so as to be influenced by the fluid discharged into said blow-off pipe and connected with the inlet valve so as to operate the same, and a non-automatic valve to control the opening into the blow-off pipe without obstructing the flow of heating fluid to the trap.

14. The combination with a radiating system, of a supply pipe, an exhaust pipe having a drip opening, a valve to control said opening, an inlet valve to control the flow from the supply pipe into the radiating system, a blow-off pipe, a thermostatic device arranged so as to be influenced by the fluid discharge into said blow-off pipe and connected with the inlet valve so as to operate the same, and a non-automatic valve to close the opening into the blow-off pipe.

15. The combination with a radiating system, of a supply pipe, a drip pipe a valve arranged to control the passage through said drip pipe, an inlet valve to control the flow from the supply pipe into the radiating system, a blow-off pipe surrounding said drip pipe, a thermostatic device arranged so as to be influenced by the fluid discharged into said blow-off pipe, and connected with the inlet valve so as to operate the same, and a hand-operated valve to close the opening into said blow-off pipe.

16. The combination with a radiating system, of a supply pipe, an exhaust pipe, an automatic trap in said exhaust pipe, an inlet valve to control the flow from the supply pipe into the radiating system, a blow-off pipe which surrounds said automatic trap, a thermostatic device arranged so as to be influenced by the fluid discharged into said blow-off pipe and connected with the inlet valve so as to operate the same, a valve to close the opening into said blow-off pipe and hand operated means for operating said valve.

17. The combination with a car, of a heating system comprising a system of radiating pipes within the car, a supply pipe, an exhaust pipe, a drip pipe leading from said exhaust pipe, an automatic valve controlling said drip pipe, a blow-off pipe extending outside of the car, and a non automatic valve for opening and closing communication between the radiating system and the blow-off pipe, a thermostat adapted to be mounted upon said blow-off pipe externally of the car so as to be operatively influenced by heating fluid passing through the blow-off pipe from the radiating system, and an automatic valve adapted to be mounted in said supply pipe and operatively connected with said thermostat so as to regulate the supply of heating fluid to said heating system.

18. A device, adapted to be attached to a car heating system provided with a trap and a blow off pipe, surrounding the trap, and extending externally of the car to be heated, said device comprising a thermostat and a valve, in operative relation to each other, said thermostat being adapted to be mounted in operative relation to the externally located portion of said blow off pipe, and said valve being adapted to be interposed in the supply pipe of said system externally of the car.

19. The combination with a car, of a heating system comprising radiators within the car, a supply pipe communicating with said radiators, an exhaust pipe leading from said radiators, a drip pipe communicating with said exhaust pipe, an automatic valve for controlling the escape of water of condensation through said drip pipe, a blow-off pipe surrounding the drip pipe and extending from a point inside of the car to a point outside of the car, a valve for opening and closing communication between the exhaust pipe and the blow-off pipe, and an attachment for converting the said system into an interchangeable system and comprising a thermostat adapted to be mounted upon the blow-off pipe outside of the car, but so as to be influenced by heating fluid escaping through said blow-off pipe, and a valve in operative relation with said thermostat adapted to be mounted in said inlet pipe and to be operated by said thermostat so as to control the flow of the heating fluid from said inlet pipe to said radiators.

20. The combination with a car, of a heating system comprising radiators within the car, a supply pipe communicating with said radiators, an exhaust pipe leading from said radiators, a drip pipe communicating with said exhaust pipe, an automatic valve for controlling the escape of water of condensation through said drip pipe, a blow-off pipe surrounding the drip pipe and extending from a point inside of the car to a point outside of the car, a valve for opening and closing communication between the exhaust pipe and the blow-off pipe, and an attachment for converting said system into an interchangeable system, said attachment comprising a casing adapted to be mounted upon said drip pipe and in communication with said blow-off pipe, means for making a tight joint between said casing and said drip pipe, a thermostat arranged to be influenced by heating fluid passing from the radiating system through said blow-off pipe, and a valve in operative relation with said thermostat and adapted to be mounted in said inlet pipe so as to control the flow of a heating fluid therethrough.

21. The combination with a radiating system, of a supply pipe, an exhaust pipe having a drip opening, a valve to control said opening, an inlet valve to control the flow from the supply pipe into the radiating system, a blow-off pipe, a thermostatic device arranged so as to be influenced by the fluid discharged into said blow-off pipe and arranged in operative relation with said inlet valve, and a positive, hand-operated valve to open and close communication between the exhaust pipe and the blow-off pipe.

22. The combination with a car, of a heating system comprising a system of radiating pipes within the car, a supply pipe, an exhaust pipe, a drip pipe leading from said exhaust pipe, an automatic valve controlling said drip pipe, a blow-off pipe extending outside of the car, and a valve for opening and closing communication between the radiating system and the blow-off pipe, of an attachment for converting such a system into an interchangeable system, said attachment comprising a thermostat adapted to be mounted externally of the car so as to be operatively influenced by heating fluid passing through the blow-off pipe from the radiating system, and an automatic valve adapted to be mounted in said supply pipe and operatively connected with said thermostat so as to regulate the supply of heating fluid to said heating system, the connections between said thermostat and said last-named valve being entirely external to said blow-off pipe.

EGBERT H. GOLD.

Witnesses:
S. H. TRUMAN,
O. R. BARNETT.